Aug. 21, 1956    A. S. MOOREHEAD    2,759,550
VEHICLE SUSPENSION FOR SELECTIVELY VARYING
THE GROUND CLEARANCE OF A VEHICLE
Filed March 14, 1955    2 Sheets-Sheet 1
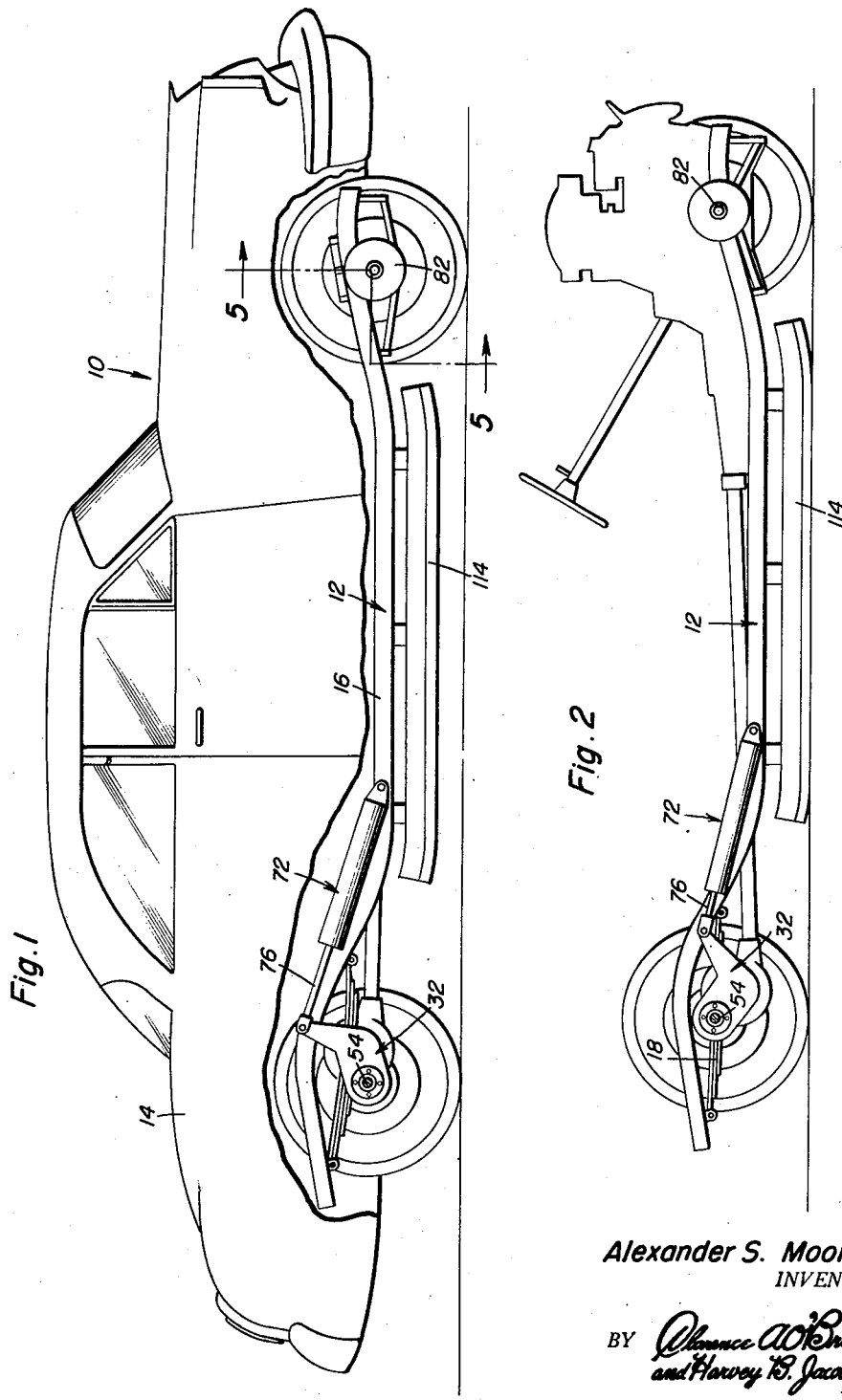
Alexander S. Moorehead
INVENTOR.

Aug. 21, 1956   A. S. MOOREHEAD   2,759,550
VEHICLE SUSPENSION FOR SELECTIVELY VARYING
THE GROUND CLEARANCE OF A VEHICLE
Filed March 14, 1955   2 Sheets-Sheet 2
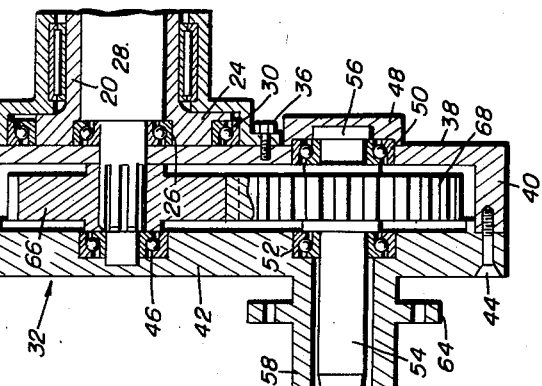
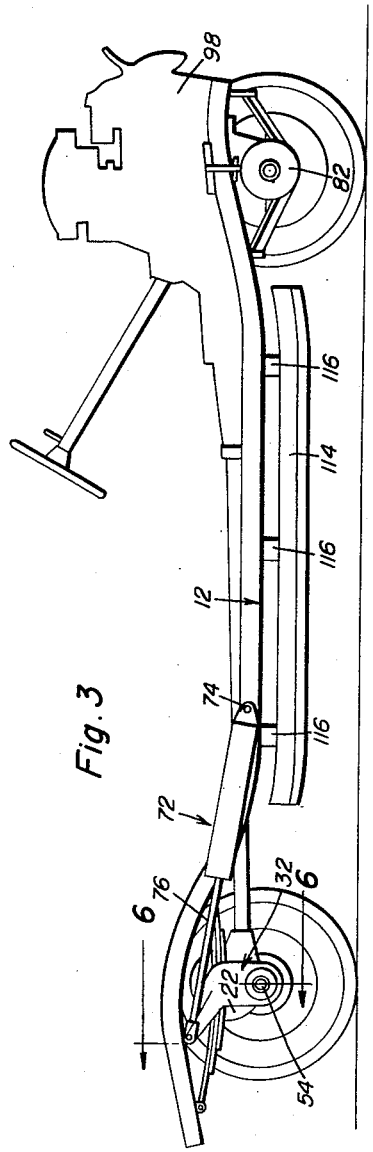
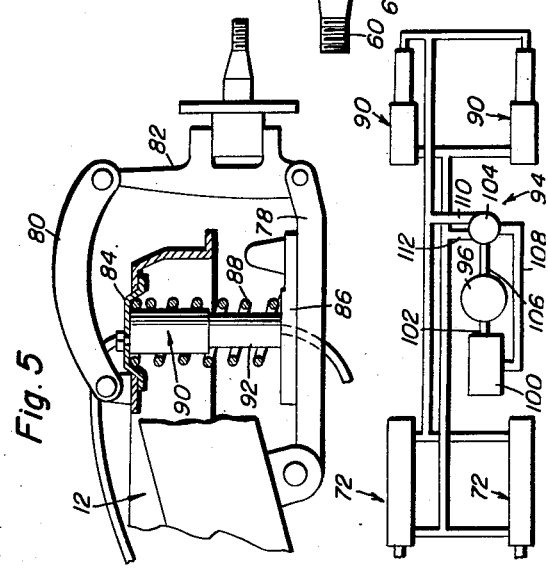
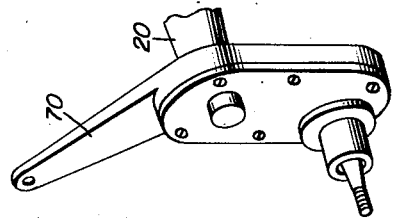
Alexander S. Moorehead
INVENTOR.
BY Clarence A. O'Brien
and Harvey B. Jackson
Attorneys

United States Patent Office 2,759,550
Patented Aug. 21, 1956

2,759,550

VEHICLE SUSPENSION FOR SELECTIVELY VARYING THE GROUND CLEARANCE OF A VEHICLE

Alexander S. Moorehead, North San Juan, Calif.

Application March 14, 1955, Serial No. 494,049

2 Claims. (Cl. 180—41)

This invention relates in general to new and useful improvements in automotive vehicle constructions, and more specifically to an improved suspension for such vehicles.

In view of the relatively high speeds now attained by vehicles, it has been found highly desirable to lower the center of gravity as much as possible. This has been accomplished by changing the body design. However, in changing the body design, there has also been a tendency to reduce the road clearance which makes many makes of cars unsatisfactory for travel over rough dirt roads where there is a large crown or where there are ruts. Futher, the amount the center of gravity may be lowered by reducing the ground clearance is very limited inasmuch as the vehicle must be suitable for all road conditions.

It is therefore the primary object of this invention to provide an improved vehicle suspension which is of such a nature whereby the ground clearance of the vehicle may be selectively raised or lowered by raising and lowering the entire vehicle relative to the ground.

Another object of this invention is to provide an improved vehicle suspension which includes stub rear axles carried by rotatably mounted housings and built-in jack mechanisms disposed within the coil springs of the front wheel suspension whereby the height of the vehicle frame with respect to the rear and front axle assemblies may be selectively varied as desired.

A further object of this invention is to provide an improved vehicle suspension for selectively varying the ground clearance of a vehicle, the vehicle also including an elongated depending ground engageable brake shoe which may be moved into ground contacting position by lowering the vehicle through the use of the vehicle suspension so that the brake shoe may serve as an emergency brake for the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and wherein:

Figure 1 is a side elevational view of a vehicle employing the vehicle suspension which is the subject of this invention, a portion of the vehicle body and frame being broken away in order to clearly illustrate the relationship of the various parts of the suspension, the vehicle being shown in an elevated position;

Figure 2 is a side elevational view of the vehicle of Figure 1 with the body entirely removed and the vehicle shown in a lowered position whereby the ground engaging emergency brake is in engagement with the ground;

Figure 3 is a side elevational view similar to Figure 2 and shows the vehicle raised to its maximum load clearance position;

Figure 4 is an enlarged fragmentary perspective view of an outer end of the rear axle housing with the rear wheel assembly being omitted and the spring hanger being omitted and shows the details of the auxiliary housing carried by the main rear axle housing;

Figure 5 is an enlarged fragmentary sectional view taken substantially upon the plane indicated by section line 5—5 of Figure 1 and shows the details of a fluid motor positioned within the coil spring of the front wheel suspension, the front wheel being omitted for purposes of clarity;

Figure 6 is an enlarged fragmentary vertical sectional view taken substantially upon the plane indicated by the section line 6—6 of Figure 3 and shows the mounting of the auxiliary rear axle housing and the stub axle, the rear wheel and its brake assembly being omitted for purposes of clarity; and Figure 7 is a schematic view of the hydraulic system for operating the vehicle suspension.

Referring now to the drawings in detail, it will be seen that there is illustrated in Figure 1 a vehicle which is referred to in general by the reference numeral 10. The vehicle 10 includes a frame 12 and a body 14 of a conventional design. The frame 12 is provided at opposite sides thereof with longitudinally extending frame rails 15. Carried by each of the frame rails 16 along the rear portion thereof is a conventional longitudinal spring 18. Secured to the longitudinal spring 18 is an elongated rear axle housing 20 which includes a differential case 22. With the exception of the modifications to be described in detail hereinafter, it is to be understood that the rear axle housing 20 will be of a conventional type.

The rear axle housing 20 is shorter than normal and terminates in an annular flange 24. The flange 24 has mounted in the inner part thereof a bearing 26 which is journaled at an outer portion of a rear axle 28. Carried by the annular flange 24 is an outer bearing 30 on which is mounted for rotation an auxiliary housing 32. The auxiliary housing 32 is retained on the annular flange 24 and the bearing 30 by a split collar 34 which is removably secured to the auxiliary housing 32 by suitable fasteners 36.

The auxiliary housing 32 includes an inner plate 38, a web portion 40 and a removable cover plate 42. The cover plate 42 is secured to the web portion 40 by suitable fasteners 44. Recessed in the cover plate 42 is an outer bearing 46 for the rear axle 28.

The auxiliary housing 32 depends below the rear axle housing 20 and the lower part of the rear plate 38 is provided with a boss 48. Positioned in the rear plate 38 in alignment with the boss 48 is an inner bearing 50. An outer bearing 52 is recessed in the cover plate 42. Journaled in the bearings 50 and 52 for rotation is a stub axle 54. The stub axle 54 is retained in place by an enlarged inner end 56 engaged in the bearing 50 and being positioned within the boss 48, and by the cover plate 42. The stub axle 54 is disposed within a journal 58 formed integral with the cover plate 42. The stub axle 54 has a reduced outer portion 60 which is externally threaded for receiving a rear axle nut, and a tapered portion 62 for wedging engagement in a rear drum (not shown). The journal 58 is provided with an annular flange 64 for the attaching of the brake assembly (not shown). It is to be understood that these last mentioned parts will be conventional and may vary in accordance with the type of wheel mounting desired.

Splined on the outer end portion of the rear axle 28 is a drive gear 66. The drive gear 66 is meshed with a driven gear 68 splined on the inner portion of the stub axle 54. Inasmuch as it is necessary to use the gears 66 and 68, the ring gear and pinion (not shown) of the rear axle assembly must be reversed to effect the right direction of drive.

Formed as an extension of the inner plate 38 is a rearwardly extending arm 70. The arm 70 has connected thereto an extensible link in the form of a fluid motor 72. The forward end of the fluid motor 72 is pivotally connected to the frame 12, as at 74. The fluid motor 72 also includes a piston rod 76 which is pivotally connected to the rear part of the arm 70. By selectively extending or retracting the piston rod 76, it will be readily apparent that the auxiliary housing 32 may be rotated about the rear axle housing 20 to raise and lower the relative position of the stub axle 54 with respect to the rear axle housing 20. Thus, the entire vehicle body 14 and the frame 12 may be raised and lowered as desired.

The vehicle 10 includes a front end of the individual wheel suspension type. This includes a lower control arm 78 and an upper control arm 80 pivotally connected to the frame 12. Extending between the outer ends of the control arms 78 and 80 is a front spindle forging 82 of a conventional type.

Carried by the frame 12 is an upper coil spring seat 84. Carried by the lower control arm 78 is a lower coil spring seat 86. Extending between the seats 84 and 86 is a coil spring 88.

It is to be understood that the front wheel suspension described above is conventional and need not be described in further detail. However, it is modified by positioning between the seats 84 and 86 an extensible fluid motor 90 in lieu of the conventional shock absorber (not shown). The fluid motor 90 includes an extensible piston 92 which may be utilized to overcome the coil spring 80 and thus raise or lower the front end of the vehicle 10.

Referring now to Figure 7 in particular, it will be seen that there is illustrated diagrammatically a fluid system for the vehicle suspension, the fluid system being referred to in general by the reference numeral 94. The fluid system 94 includes a pump 96 which may be connected to the engine 98 of the vehicle 10. Suitably positioned in the vehicle 10 is a reservoir 100 which is connected to the pump 96 by a fluid line 102. The fluid system 94 also includes a manually controllable valve 104 which is connected to the pump 96 by a fluid line 106.

The valve 104 is also connected to the reservoir 100 by a fluid line 108. Suitable fluid lines 110 and 112 connect opposite ends of the fluid motors 72 and 90 to the valve 104.

The normal running position of the vehicle 10 is illustrated in Figure 1. When it is desired to go over rough roads and it is necessary to increase the road clearance, the fluid motors 72 and 90 are extended so as to lift the frame 12, as is best illustrated in Figure 3. On the other hand, if it is desired to lower the road clearance of the vehicle 10, the fluid motors 72 and 90 are retracted and the frame 12 is lowered, as is best illustrated in Figure 2.

Carried by the frame 12 and depending therefrom is an elongated ground engageable brake shoe 114. The brake shoe 114 is secured to the frame 12 by suitable hangers 116. The brake shoe 114 forms an emergency brake and is engaged with the ground when the frame 12 is lowered, as is illustrated in Figure 2. It is primarily intended that the frame 12 be so lowered only when the vehicle 10 is in a stopped position. However, in cases of emergency, the frame 12 could be lowered so as to engage the brake shoe 114 with the ground in order to facilitate the stopping of the vehicle 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A vehicle suspension for selectively varying the ground clearance of a vehicle, said vehicle suspension comprising a rear axle assembly including a rear axle housing, spring suspension for said rear axle assembly attached to said rear axle housing, auxiliary housings rotatably mounted on outer ends of said rear axle housing, rear axles carried by said rear axle housing having ends projecting into said auxiliary housings, stub axles rotatably carried by said auxiliary housings in offset relation to said rear axles, gear means in said auxiliary housings interconnecting said rear axles and said stub axles, and means connected to said auxiliary housings for positioning and retaining the same in adjusted positions, an elongated ground engageable brake shoe depending below the vehicle and selectively engageable with the ground by decreasing the ground clearance of the vehicle.

2. A vehicle suspension for selectively varying the ground clearance of a vehicle, said vehicle suspension comprising a rear axle assembly including a rear axle housing, spring suspension for said rear axle assembly attached to said rear axle housing, auxiliary housings rotatably mounted on outer ends of said rear axle housing, rear axles carried by said rear axle housing having ends projecting into said auxiliary housings, stub axles rotatably carried by said auxiliary housings in offset relation to said rear axles, gear means in said auxiliary housings interconnecting said rear axles and said stub axles, and means connected to said auxiliary housings for positioning and retaining the same in adjusted positions, said means including an arm on each auxiliary housing, and an adjustable link extending between said arm and a frame of the vehicle, said adjustable link being in the form of a fluid motor, a fluid system connected to said fluid motor for operating the same, and a front wheel suspension including coil springs and seats, vertically disposed fluid motors in said coil springs and connected to said seats, means connecting the last mentioned fluid motors to said fluid system for operation simultaneously with the first mentioned fluid motors, an elongated ground engageable brake shoe depending below the vehicle and selectively engageable with the ground by decreasing the ground clearance of the vehicle.

References Cited in the file of this patent
UNITED STATES PATENTS

| | | |
|---|---|---|
| 2,278,215 | Poche | Mar. 31, 1942 |
| 2,610,048 | Lindgren | Sept. 9, 1952 |
| 2,693,719 | Johnson | Nov. 9, 1954 |